June 26, 1962
H. HENNIG
3,041,393
TELEVISION SYSTEM FOR INSPECTING THE INNER
WALLS OF ENCLOSED SPACES
Filed June 30, 1958
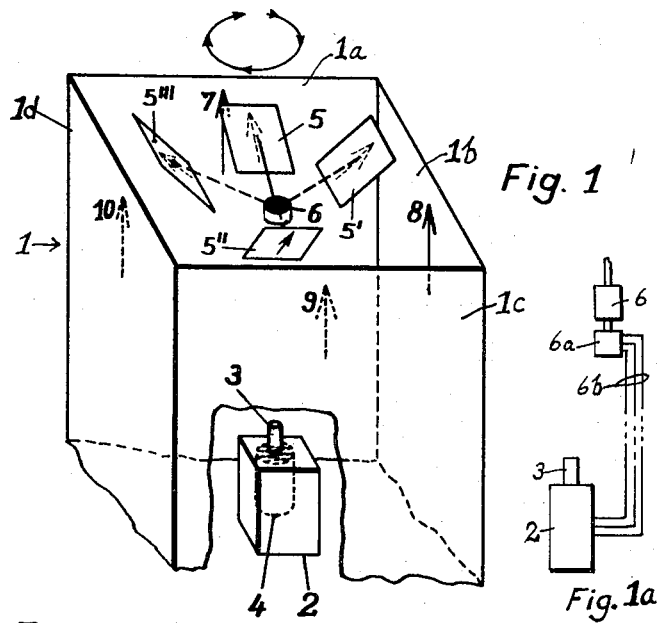
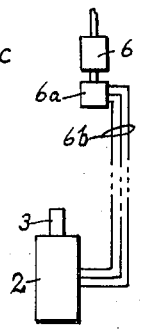
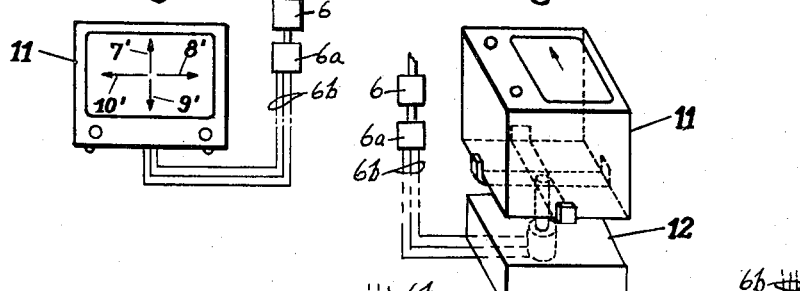
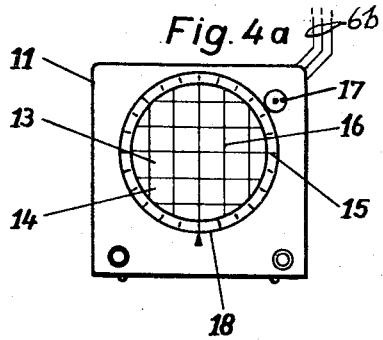
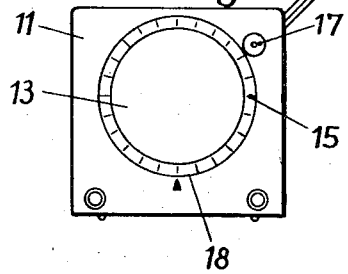
Inventor
Horst Hennig
By Ralph B. Stewart
Attorney United States Patent Office 3,041,393
Patented June 26, 1962

3,041,393
TELEVISION SYSTEM FOR INSPECTING THE INNER WALLS OF ENCLOSED SPACES
Horst Hennig, Furth, Bavaria, Germany, assignor to Max Grundig, Furth, Germany
Filed June 30, 1958, Ser. No. 745,473
13 Claims. (Cl. 178—6.8)

This invention relates to the art of inspecting the inner walls of enclosed spaces which are inaccessible to inspection by direct vision of the human eye, such as earth bores and long tubes which are too small for a person to enter.

It is old to use television cameras for the observation or examination of the inner walls of cavities or tubes or the like. Along with the direct observation of the surfaces of interest by means of the camera with the help of a suitable lens system, especially good results have been obtained by the use of mirrors. In the preferred embodiments the mirrors (wedge type mirrors, conical mirrors, flat mirrors, etc.) are connected with arrangements through which they can be rotated about an axis parallel to or concentric with the optical axis of the television pickup camera. In such arrangements the mirrors have a certain inclination with respect to the walls being examined. In a known system of the type described an oval mirror, for example, is used which is mounted at an inclination of 45° to the optical axis of the camera and, if the rotation about the camera axis is constant, a picture of the surface to be observed is thrown on the light sensitive layer of the picture pickup tube.

However, it has been shown that in such cases it becomes practically impossible for an observer at the reproducing apparatus (the television receiver) to determine the position of a specified object or the like relative to a fixed reference direction. The reason for this difficulty is that there then occurs an angular shift in a direction axially of the image with respect to the raster if the surface being examined has a position not in the direction of the scanning raster of the camera.

In order to eliminate this disadvantage an effort had heretofore been made to blend in optically with the picture as a whole the momentary position of the rotating mirror by the use of a signal emanating from the mirror, for example, from lines or points on its surface.

However, it is also impossible by this arrangement to eliminate the serious disadvantage that in the measurement of angles, for example, the angle must be determined from time to time from another base. This problem of angle measurement arises for example in the investigation of bore holes for the determination of fault-structures (elongated breaks or cleavages) in rock in geology. As the reference line of the angle being investigated rotates along with the rotating mirror on the receiving apparatus this known process requires a large expenditure of time and demands constant attention from the observer.

This invention relates to a process for orientation of the picture content of surfaces observed by means of a television pickup camera with the aid of a rotating mirror inclined to the optical axis of the television pickup camera, which surfaces preferably lie parallel to the optical axis of the television pickup camera, such surfaces for example as the inner surfaces of tubes. It avoids the disadvantages of the known arrangements, and effects a constant fixed correlation (coordination) of the images on the receiving apparatus with respect to any desired fixed reference direction. For this purpose the pickup raster, or the reproduction raster, is rotated in space synchronously with the turning of the mirror.

The invention can be embodied in circular, star shaped, spiral or quadratic scanning systems, for example, by turning the raster that is in use at the moment in the pickup camera, or in the receiver, relatively to the housing (or chassis or the like). To accomplish this it is possible either to turn the deflection system itself mechanically or else through suitable electric switching devices to effect a purely electronic control of the turning of the raster.

An especially simple embodiment of the invention is an arrangement in which the pickup raster remains stationary and the whole television receiver is rotated about the axis of the picture tube synchronously with the rotation of the mirror. Preferably the screen of the picture tube is arranged to be horizontal. The apparatus can be set up in the form of a console or of a display device in such a way that the observer looking at it can always get a picture that is stationary with respect to a fixed line of reference, whereby as the picture content changes the reproduced picture changes in conformance therewith.

It is also possible with a stationary pickup raster and with a stationary receiver to use a cover disc over the picture screen or to provide around the picture screen a circular or frame-shaped ring disc which is suitably provided with a scale and, by a proper driving means, is rotated in synchronism with the rotation of the mirror, and therefore indicates unequivocally the momentary angle relative to the reference line.

Further details of the invention as explained more fully with the help of the drawings, which represent certain embodiments by way of example.

FIGURE 1 represents a known arrangement using a rotating mirror and a television camera for inspecting the inner walls of a rectangular tube;

FIGURE 1a is a diagram showing a modification of FIGURE 1 according to the present invention;

FIGURE 2 is a view of the television picture produced by the arrangement of FIGURE 1;

FIGURE 3 shows a television receiver mounted, according to the invention, with its picture screen horizontal and the set being turned about a vertical axis synchronously with the rotation of the mirror at the pick-up station; and FIGURES 4a and 4b show other arrangements for indicating the momentary angle of the picture with reference to a fixed reference line.

FIGURE 1 shows, in a purely schematic manner, a known arrangement for examining the interior walls of closed spaces or the like. The hollow space being investigated is represented as a rectangular tube 1 formed by its side wall surfaces 1a, 1b, 1c and 1d. It is obvious that it is possible to examine circular internal surfaces, or internal surfaces of other cross sectional shapes. The television pickup camera 2 with the optic 3 and the picture pickup tube 4 are arranged in the hollow space in such a way that the optical axis of the optic 3 and/or of the pickup tube 4 runs parallel to the edges of the plane surface 1, or parallel with the tube axis. A mirror 5 is mounted within tube 1 with its plane inclined to the axis of the tube and is rotated clockwise for example about the tube axis by a suitable motor device 6. As the mirror rotates it throws an image of a side wall area upon the camera optic 3 and therefore upon the light sensitive layer of the picture pick-up tube 4. The means for mounting and for moving the camera 2 within tube 1 and the connection to mirror 5 are not illustrated.

In order to explain the inventive thought, there is shown in FIGURE 1 upwardly directed arrows 7, 8, 9 and 10 marked on the side wall surfaces 1a, 1b, 1c and 1d, respectively. These arrows may represent elongated faults, such as breaks or cleavages, in the respective walls. Mirror 5 is shown in various positions marked 5, 5', 5" and 5'''. In the positions indicated, the mirror image of each of arrows 7 to 10 is shown in dashed lines in the mirror. If for example the scanning electron beam in the picture pickup tube 4 swings from right to left in the figure and from front to back, there is produced on an associated receiver screen as shown schematically in FIGURE 2, the positions of the several image elements as follows: arrow 7 of FIGURE 1 is reproduced in FIGURE 2 as the upwardly directed arrow 7′, arrow 8 is reproduced as arrow 8′ directed to the right, arrow 9 appears in FIG. 2 as arrow 9′ directed downward, and arrow 10 appears in FIG. 2 as arrow 10′ directed to the left. With continuous movement or rotation of mirror 5 the arrow points move as the mirror 5 moves over the individual intervening positions on the picture screen in the direction shown by the arrows in FIGURE 2. Insofar as the matter in question is one of measuring the structures or the images on the surfaces which do not lie in a position parallel to the optical axis of the television camera, there arise difficulties which are almost impossible to overcome. It is not easy to determine the position of the mirror at a given moment and how the angular relations which change constantly on the receiving apparatus 11 are to be brought into proper correlation for identifying the particular surface under examination at any given instant.

According to the invention a clear coordination is obtained by providing other electrical or mechanical means connected to be driven simultaneously with the drive means 6 for the mirror 5 to effect a rotation of, for example, the raster in the picture pick-up camera 2. This may be done electrically by varying the phase of the currents or voltages energizing the beam deflection elements of tube 4, by well-known means. Also, it is possible to turn the pick-up raster in the camera by physically turning the deflection elements, or by turning both the tube and the deflection elements. This solution would however be somewhat complicated both mechanically and electronically. It is also entirely feasible to turn the whole camera 4 about the optical axis as an axis of rotation in the same direction as the mirror.

FIGURE 1a shows diagramatically a modification of FIGURE 1 according to the present invention for rotating the raster in camera 2 synchronously with the rotation of the mirror 5. As shown, a suitable servo transmitter 6a driven by the motor device 6 is connected through a suitable cable or transmission channel 6b to the camera 2 where it effects rotation of the raster in the camera, either electrically or by rotation of the deflecting elements as explained above. Where the raster is rotated synchronously, the transmitter 6a would vary the phase of the currents or voltages energizing the beam deflecting elements. Where the rotation is obtained by rotating the beam deflecting elements, the receiver in the servo system would be a motor which rotates the deflecting elements.

Instead of rotating the raster in the camera 2, rotation of the raster in the television receiver may be effected by a similar arrangement involving a servo transmitter 6a connected to the raster forming portion of the receiver 11 through the control cable 6b.

The raster in camera 2, or in receiver 11, instead of being formed of straight parallel lines, may be formed of circular paths formed concentrically about a central point, or a single spiral path formed about a central point, or scanning paths extending radially from the central point and displaced angularly about such point. Rotation of the raster electrically is accomplished by varying the phasing of the current or voltage energizing the beam deflecting element.

It is just as feasible to give the receiver 11 such a form that the picture tube turns in the proper direction (in this case in counter-clockwise direction) as a result of which the arrows on the surfaces 1 which are always directed upward would show up on the picture screen always pointing up. A particularly simple embodiment is illustrated in FIGURE 3, which shows the television receiver 11 with the picture screen in horizontal position which is rotated simultaneously by a drive means 12 controlled over cable 6b and operating synchronously with the drive means 6 for the mirror. In the arrangement, for example, the arrow would always show up stationary in a fixed position in space while the apparatus under it would be turning.

As is shown schematically in FIGURE 4a, the process according to the invention can be carried out in such a way that the reproducing apparatus 11 stands still and over the screen picture surface 13 a transparent cover disc 14, which can be provided with a suitably graduated annular scale 15 or with a coordinate grid 16, is rotated with the help of a drive means 17 controlled over cable 6a and rotating synchronously with the drive 6 of mirror 5. By this means there is assured also a constant unequivocal relation between a certain direction in space and the picture image. The coordinate grid 16 can in this case be rectangular as shown in FIGURE 4a, or it may be curvilinear (circular or the like). A small disadvantage in this embodiment consists however in the fact that the image turns constantly, and for this reason the reading of the picture content becomes somewhat difficult for the observer.

In FIGURE 4b the screen picture surface 13 of the reproducing apparatus 11 is surrounded by a rotary ring which carries a divided scale, e.g. a scale 15 divided in degrees. This ring scale 15 is turned with the help of the arrangement 17 again controlled over cable 6a and driven synchronously with the mirror 5.

It has been found to be expedient to use similarly controlled synchronous motors or rotary field producers for the production of the raster or of the raster-marking elements or also of the reproducing apparatus and the like. They can also be provided with still other devices that make it possible to send back automatically signals that indicate their position with respect to the fixed raster.

The invention is not limited to the embodiments that have been described and shown by way of example, but is capable of being embodied in various forms provided only that one of the two rasters or one of the two images is rotated in proper relation to the other synchronously with the mirror or some other optical device for producing an image of the internal walls.

I claim:

1. A system for examining the inner walls of an enclosed space comprising, in combination, a pick-up television camera positioned within said enclosed space and embodying a cathode-ray tube having raster-producing means, said camera being mounted with its optical axis parallel with the walls of said space, a mirror arranged to reflect an image of a wall area into said camera along its optical axis and being mounted for rotation about said axis and relative to said camera to scan the walls of said space, the image of the wall area produced in said camera being sufficiently large to indicate direction of elongated faults within the imaged area, a television receiver arranged outside of said enclosed space and embodying a cathode-ray tube having raster-producing means, and raster-rotating means operating in timed relation with the rotation of said mirror to effect rotation of the raster of one of said cathode-ray tubes in synchronism with the rotation of said mirror.

2. A system according to claim 1 wherein said raster-producing means of the tube having a rotating raster comprises stationary beam-deflecting elements, and said raster-rotating means comprises means for variably energizing said beam-deflecting elements to produce the rotation of said raster.

3. A system according to claim 1 wherein said raster-rotating means comprises means for rotating the beam-deflecting elements of one of said tubes with respect to said one tube.

4. A system according to claim 1 wherein said television receiver tube is mounted with the picture screen in a horizontal plane, and said raster-rotating means comprises means for rotating the beam-deflecting elements of said receiver tube about a vertical axis.

5. A system according to claim 1 wherein said television receiver is mounted with its picture screen in a horizontal plane, and said raster-rotating means rotates the raster of said receiver and comprises means for rotating the entire receiver about a vertical axis in synchronism with the rotation of said mirror.

6. A system according to claim 1 and including an indicator element arranged adjacent the picture screen of said television receiver and mounted to rotate about a central point of said screen, and means operating in timed relation with the rotation of said mirror to effect rotation of said indicator element in synchronism with the rotation of said mirror.

7. A system according to claim 1 wherein both said raster-producing means forms a raster of scanning paths extending radially from said central point and displaced angularly about said point.

8. A system according to claim 1 wherein said raster-producing means of the tube having a rotating raster comprises stationary beam-deflecting elements producing angular deflection of the cathode ray about a central point, and said raster-rotating means comprises means for energizing said beam-deflecting elements with energy of varying phase to produce the rotation of said raster about said central point.

9. A system according to claim 8 wherein said raster-producing means forms a raster of concentric circular paths.

10. A system according to claim 8 wherein said raster-producing means forms a raster of a single path formed spirally about said central point.

11. In a system for examining the inner walls of an enclosed space comprising a pick-up television camera positioned within said enclosed space and mounted with its optical axis parallel with the walls of said space, a mirror being arranged to reflect an image of a wall area into said camera along its optical axis and the image of the wall area produced in said camera being sufficiently large to indicate direction of elongated faults within the imaged area, being mounted for rotation about said axis to scan the walls of said space, and including a television receiver arranged outside of said enclosed space and reproducing said image, the improvement comprising an indicator element arranged adjacent the picture screen of said television receiver and mounted to rotate about a central point of said screen, and means operating in timed relation with the rotation of said mirror to effect rotation of said indicator element in synchronism with the rotation of said mirror.

12. A system according to claim 11 wherein said indicator element comprises an annular member surrounding the picture screen of said receiver.

13. A system according to claim 11 wherein said indicator comprises an open-mesh grid arranged in front of the picture screen of said receiver tube.

References Cited in the file of this patent

UNITED STATES PATENTS

| | | |
|---|---|---|
| 1,660,886 | Randall | Feb. 28, 1928 |
| 2,404,030 | Browne | July 16, 1946 |
| 2,406,751 | Emerson | Sept. 3, 1946 |
| 2,483,432 | Richardson | Oct. 4, 1949 |
| 2,632,801 | Donaldson | Mar. 24, 1953 |
| 2,649,500 | Fedorchak | Aug. 18, 1953 |
| 2,664,522 | Page | Dec. 29, 1953 |
| 2,697,797 | Holmes | Dec. 21, 1954 |
| 2,825,044 | Peterson | Feb. 25, 1958 |

UNITED STATES PATENT OFFICE
CERTIFICATE OF CORRECTION

Patent No. 3,041,393                        June 26, 1962

Horst Hennig

It is hereby certified that error appears in the above numbered patent requiring correction and that the said Letters Patent should read as corrected below.

Column 6, lines 4 to 7, strike out "the image of the wall area produced in said camera being sufficiently large to indicate direction of elongated faults within the imaged area, and insert the same after "space," in line 8, same column 6.

Signed and sealed this 8th day of October 1963.

(SEAL)
Attest:

ERNEST W. SWIDER
Attesting Officer

EDWIN L. REYNOLDS
Acting Commissioner of Patents